Aug. 28, 1923.
E. F. POTTER
INDICATING DEVICE
Filed Oct. 2, 1922
1,466,479
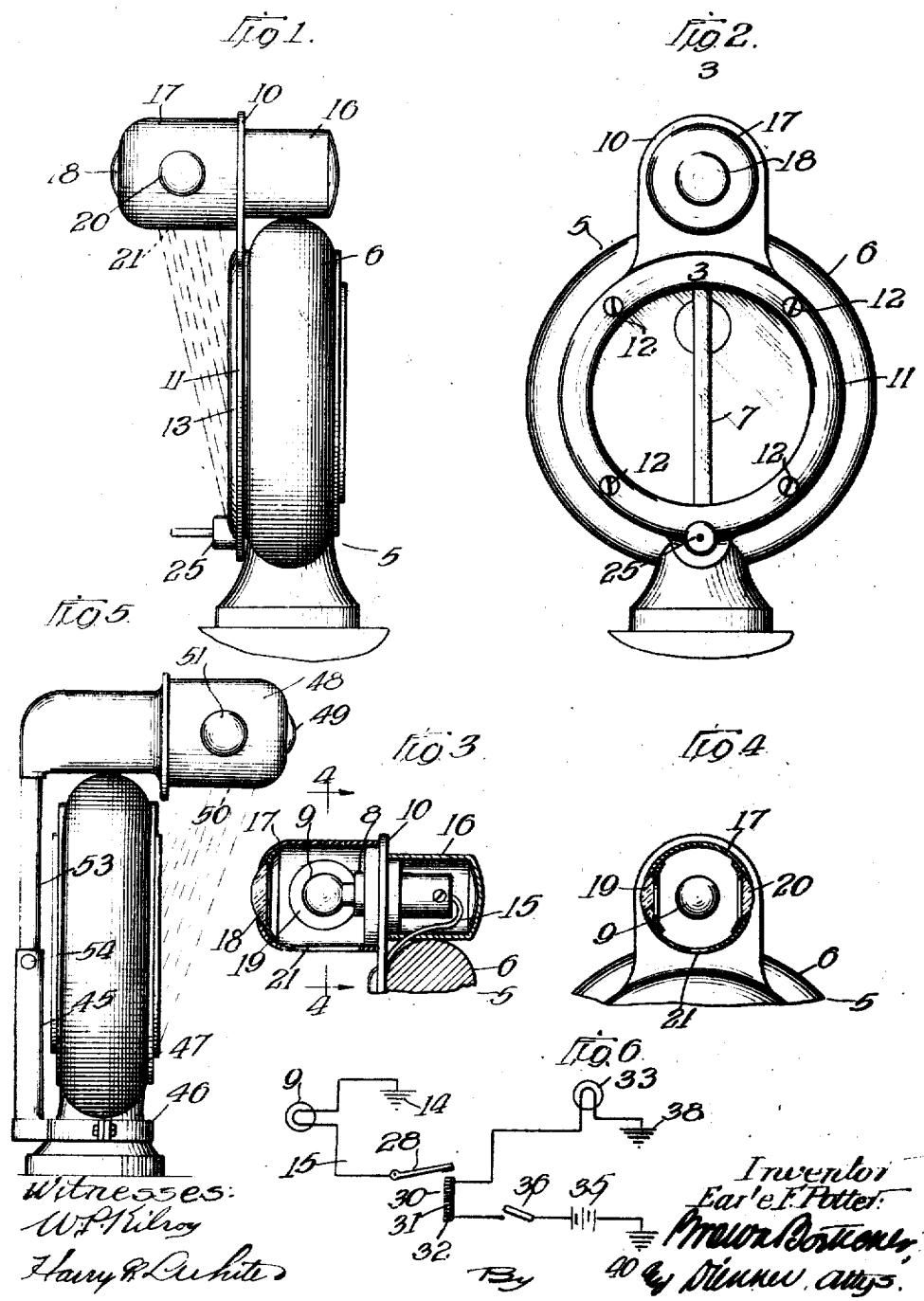

Patented Aug. 28, 1923.

1,466,479

UNITED STATES PATENT OFFICE.

EARLE F. POTTER, OF CHICAGO, ILLINOIS, ASSIGNOR TO THE POTTER SPECIALTIES COMPANY, OF CHICAGO, ILLINOIS, A CORPORATION OF ILLINOIS.

INDICATING DEVICE.

Application filed October 2, 1922. Serial No. 591,999.

*To all whom it may concern:*

Be it known that I, EARLE F. POTTER, a citizen of the United States, residing at Chicago, in the county of Cook and State of Illinois, have invented a certain new and useful Improvement in Indicating Devices, of which the following is a full, clear, concise, and exact description, reference being had to the accompanying drawings, forming a part of this specification.

My invention relates to indicating devices and more particularly to indicating devices for use upon motor vehicles and the like.

It is customary to place signal lights upon vehicles, such for example as the head, tail and side lights. Some of these, as for example, the tail or stop signals now in use, are positioned out of the field of observation of the driver so that he is not apprised as to whether or not they are functioning properly. It is also customary to employ various indicators in connection with the operation of the vehicle. Vision of some of these at night, as for example, the temperature indicator positioned on the radiator cap is difficult if not impossible, a continuous illumination of the temperature indicator is very trying on the eyes at night, especially in driving over long stretches of unlighted road.

The object of my invention is the provision of device which will indicate to the driver when for any cause, the tail or stop-light, for example, fails to function properly and which will at the same time illuminate the temperature or other indicator, periodic observation of which is desirable, to direct the driver's attention thereto and render the same visible for inspection from the driver's seat.

Another object is to provide for conveniently mounting the device and supporting the same adjacent the indicator in connection with which it is used.

Another object is to provide a device adjustable to any size of indicator.

Further objects and advantages will become apparent as this description proceeds.

In the drawings:

Figure 1 is a side elevational view of a temperature indicator showing an embodiment of my invention in connection therewith;

Figure 2 is a front elevational view of same;

Figure 3 is a vertical sectional view taken on the line 3—3 of Figure 2;

Figure 4 is a vertical sectional view taken on the line 4—4 of Figure 3;

Figure 5 is a side elevational view of a modification; and

Figure 6 shows diagrammatically one circuit for operating the device of my invention.

In the embodiment shown in Figs. 1 to 4 inclusive, 5 designates a temperature indicator comprising a frame 6 adapted for mounting in upright position upon the radiator filler cap of the vehicle and having a thermometer 7 arranged in the usual or any preferred manner therein, for indicating the condition of the engine.

A socket member 8 adapted to receive a suitable lamp 9 is mounted in an ear 10 projecting upwardly from an annular frame 11 encircling the face of the indicator 5 towards the driver's seat and secured thereto by suitable screws 12, which screws may in addition clamp the retention ring 13 in place. The lamp 9, one terminal of which may be grounded as shown at 14 in Figure 6, is supplied through a conductor 15 which leads up through the ring 13, which ring is preferably semi-circular in cross section. The conductors 15 extend down through the passage provided by the bulged formation of the ring 13 and are connected with a pin and socket connector 25, one part of which is secured to the frame 11 while the other is carried by the end of a suitable conductor which may be provided to deliver current to the device. The projecting socket 8 and connections thereto are enclosed against the weather and to give the device a finished appearance by a cap or hood 16.

A hood 17 encloses the lamp 9. The end of this hood 17 is provided with a lens 18 facing the driver's seat and a pair of diagrammetrically opposite panes or lenses 19 and 20. A relatively narrow longitudinal slot 21 in the bottom of the hood 17 permits rays of light from the lamp 9 when the same is illuminated to fall on the thermometer 7 to direct the driver's attention thereto.

The conductor which connects with the conductor 15 through the connector 25 is connected at its opposite end, in the embodiment shown, with the armature 28 (Fig. 6) of a relay of the type disclosed in my co-pending application Serial 515,228, filed July 15, 1922. The coil 30 surrounding the core 31 and connected therewith at 32 is connected to one side of the stop signal 33 the opposite side of which is grounded as shown at 38. Of course the invention may be practiced with a direction, tail or other signal circuit. The opposite end of the coil 30 which is connected with the core 31 at 32 is connected to source of current 35 thru a switch 36. The source 35 is grounded at 40.

It will now be apparent that when the stop lamp 33 is illuminated as by operation of the brake mechanism of the vehicle that the magnetic action of the coil 30 will attract the armature 28 into contact with the core 31. This contact of the armature 28 with the core 31 completes the circuit through the lamp 9 by way of the core 31, armature 28, conductor 15 and ground 14. If the lamp or signal 33 functions properly the lamp 9 will light and illuminate the lens 18 to apprise the driver that the signal is functioning properly and also the temperature indicator 5 to direct the driver's attention to said indicator. Should the lamp or signal 33 for any reason fail to function, the lamp 9 will not light and the driver of the vehicle will thereby be apprised of such failure.

Illumination of the temperature indicator only upon operation of the signal 33 avoids the distraction of a constantly illuminated indicator and at the same time the driver's attention is directed to the indicator every time the signal is operated instead of leaving it solely to the driver to observe the indicator periodically without reminding him or directing his attention so that he will make such observation. Furthermore, additional deliberate operations by the driver are avoided. The relay and circuit arrangement, described provides for adequate illumination of the temperature indicator when the signal is operated without taking current from or decreasing the brilliancy of the signal lamp. The invention is not limited to use with stop signals but is adapted for use with any automatic means for intermittently operating the same.

In the embodiment shown in Figure 5 the support is made adjustable to be conveniently adjusted to and mounted upon any size or type of indicator. The support in this case comprises a hollow stem or post 45 having a clamp 46 at its lower end for securing it to the temperature indicator 47. The lamp carrying fixture 48 with its lens 49 facing the driver's seat, slot 50 for directing rays of light on the indicator 47, panes 51, and enclosing portion 52, is provided with a hollow stem 53 which telescopes into with the upper end of the stem or post 45. To fit the device to the desired temperature indicator the stem 53 is telescoped into or withdrawn from the stem 45 to the desired adjustment, preferably to the point at which the fixture portion 48 engages upon the upper edge of the temperature indicator as shown. The screw 54 is then tightened up to secure the same in adjusted position. The conductor for supplying the lamp extends up through the hollow stems 45 and 53 and is connected to the lamp receiving socket mounted in the fixture 48.

I claim:

1. In combination with a rear signal light normally not lighted when the vehicle is running at night, means for intermittently lighting said light upon certain manipulations by the driver in controlling the car, and a temperature indicator remote from the driver's position; a tell-tale light positioned to illuminate said temperature indicator and electric connections for illuminating said tell-tale light simultaneously with said signal light, whereby said tell-tale light intermittently apprises the driver that the signal is functioning and simultaneously reminds him of the temperature indicator.

2. In combination, a temperature indicator for a motor vehicle positioned at a point where constant illumination would interfere with road vision, and automatic means for frequently illuminating said indicator at relatively brief intervals only.

3. In combination with a rear signal light normally not lighted when the vehicle is running at night, means for intermittently lighting said light upon certain changes in the movement of the vehicle, and an indicating device remote from the driver's position; a tell-tale light positioned to illuminate said indicating device, and electric connections for operating said tell-tale light simultaneously with said signal light, whereby said tell-tale light intermittently apprises the driver that the signal is functioning and simultaneously reminds him of the indicating device.

In witness whereof, I hereunto subscribe my name this 28 day of September, 1922.

EARLE F. POTTER.